United States Patent
Kennedy et al.

(10) Patent No.: US 11,261,741 B2
(45) Date of Patent: Mar. 1, 2022

(54) CERAMIC AIRFOIL TRAILING END CONFIGURATION

(71) Applicant: United Technologies Corporation, Farmington, CT (US)

(72) Inventors: Matthew B. Kennedy, Vernon, CT (US); Paul F. Croteau, Columbia, CT (US); John E. Holowczak, South Windsor, CT (US); Thomas J. Martin, East Hampton, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 16/678,927

(22) Filed: Nov. 8, 2019

(65) Prior Publication Data
US 2021/0140325 A1  May 13, 2021

(51) Int. Cl.
*F01D 5/28* (2006.01)
*F01D 5/14* (2006.01)
*F01D 5/18* (2006.01)

(52) U.S. Cl.
CPC ............. *F01D 5/282* (2013.01); *F01D 5/147* (2013.01); *F01D 5/188* (2013.01); *F05D 2220/32* (2013.01); *F05D 2300/6033* (2013.01)

(58) Field of Classification Search
CPC ........... F01D 5/188; F01D 5/147; F01D 5/282
See application file for complete search history.

(56) References Cited

U.S. PATENT DOCUMENTS

| | | | |
|---|---|---|---|
| 6,451,416 B1 | 9/2002 | Holowczak et al. | |
| 7,066,717 B2 | 6/2006 | Morrison et al. | |
| 7,326,030 B2* | 2/2008 | Albrecht | F01D 5/147 |
| | | | 415/115 |
| 7,600,978 B2* | 10/2009 | Vance | F01D 5/147 |
| | | | 416/230 |
| 8,807,945 B2* | 8/2014 | Spangler | F01D 5/187 |
| | | | 416/97 R |
| 9,683,443 B2 | 6/2017 | Freeman et al. | |
| 9,896,954 B2* | 2/2018 | Walston | B32B 5/26 |
| 10,060,264 B2* | 8/2018 | Moga | F01D 5/187 |

(Continued)

FOREIGN PATENT DOCUMENTS

| | | |
|---|---|---|
| EP | 3438411 | 2/2019 |
| WO | 2015047698 | 4/2015 |

OTHER PUBLICATIONS

European Search Report for European Patent Application No. 20205902.8 completed Feb. 8, 2021.

*Primary Examiner* — Michael L Sehn
(74) *Attorney, Agent, or Firm* — Carlson, Gaskey & Olds, P.C.

(57) ABSTRACT

An airfoil includes an airfoil body that has a trailing edge region. The trailing edge region includes first and second monolithic ceramic exterior walls, a flow discharge passage between the first and second monolithic ceramic exterior walls, a ceramic matrix composite (CMC) liner at least a portion of which is disposed in the flow discharge passage between the first and second monolithic ceramic exterior walls, and an array of pedestals disposed in the flow discharge passage. Each of the flow guides bridges the CMC liner and at least one of the first and second monolithic ceramic exterior walls.

15 Claims, 6 Drawing Sheets

(56) References Cited

U.S. PATENT DOCUMENTS

| | | | |
|---|---|---|---|
| 2014/0093379 A1* | 4/2014 | Tibbott | F01D 5/188 |
| | | | 416/224 |
| 2016/0230569 A1* | 8/2016 | Duelm | F01D 5/147 |
| 2017/0030199 A1* | 2/2017 | Barker | F01D 9/041 |
| 2018/0023398 A1* | 1/2018 | Jones | F01D 5/145 |
| | | | 416/95 |
| 2018/0179906 A1 | 6/2018 | Schetzel et al. | |
| 2019/0330988 A1 | 10/2019 | Hillier | |

* cited by examiner

CERAMIC AIRFOIL TRAILING END CONFIGURATION

STATEMENT REGARDING FEDERALLY SPONSORED RESEARCH OR DEVELOPMENT

This invention was made with government support under U.S. Government contract No. DE-FE0031622 awarded by the Department of Energy. The Government has certain rights in this invention.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

An airfoil according to an example of the present disclosure includes an airfoil body that has a trailing edge region. the trailing edge region includes first and second monolithic ceramic exterior walls, a flow discharge passage between the first and second monolithic ceramic exterior walls, a ceramic matrix composite (CMC) liner at least a portion of which is disposed in the flow discharge passage between the first and second monolithic ceramic exterior walls, and an array of pedestals disposed in the flow discharge passage. Each pedestal bridges the CMC liner and at least one of the first and second monolithic ceramic exterior walls.

In a further example of any of the foregoing embodiments, the CMC liner divides the flow discharge passage into first and second sub-passages between, respectively, the CMC liner and the first monolithic ceramic wall and the CMC liner and the second monolithic ceramic wall.

In a further example of any of the foregoing embodiments, the pedestals are monolithic ceramic.

In a further example of any of the foregoing embodiments, one of the first or second monolithic ceramic exterior walls includes a cutback.

In a further example of any of the foregoing embodiments, the CMC liner extends beyond the cutback.

In a further example of any of the foregoing embodiments, one of the first or second monolithic ceramic walls is scalloped.

In a further example of any of the foregoing embodiments, the CMC liner includes a liner pressure side wall and a liner suction side wall, and the flow discharge passage is between the liner pressure side wall and the liner suction side wall.

In a further example of any of the foregoing embodiments, the liner pressure side wall and the liner suction side wall meet at a position beyond a terminal edge of at least one of the first or second monolithic ceramic exterior walls.

In a further example of any of the foregoing embodiments, the CMC liner includes orifices connecting the flow discharge passage to an exterior of the airfoil.

An airfoil according to an example of the present disclosure includes a monolithic ceramic shell that defines a leading end, a shell pressure side wall, and a shell suction side wall. the monolithic ceramic shell circumscribes a core passage. A ceramic matrix composite (CMC) liner defines a liner pressure side wall that lines the shell pressure side wall and a liner suction side wall that lines the shell suction side wall. The liner pressure side wall and the liner suction side wall converge to form a liner tail. The pressure side wall and the suction side wall converge around the liner tail in a trailing end region. There is a flow discharge passage in the trailing edge region between the shell pressure side wall and the shell suction side wall. The flow discharge passage is connected with the core passage, and there are pedestals disposed in the flow discharge passage.

In a further example of any of the foregoing embodiments, the pedestals are bonded to at least one of the shell pressure side wall or the shell suction side wall.

In a further example of any of the foregoing embodiments, the pedestals are monolithic ceramic.

In a further example of any of the foregoing embodiments, the pedestals are bonded to the CMC liner.

In a further example of any of the foregoing embodiments, the liner pressure side wall and the liner suction side wall meet to form the liner tail.

In a further example of any of the foregoing embodiments, the liner pressure side wall and the liner suction side wall include metering orifices therein or between the pedestals connecting the core passage and the flow discharge passage.

In a further example of any of the foregoing embodiments, the liner tail divides the flow discharge passage into sub-passages.

In a further example of any of the foregoing embodiments, the shell pressure side wall includes a cutback.

An airfoil according to an example of the present disclosure includes a monolithic ceramic shell that defines a leading end, a shell pressure side wall, and a shell suction side wall. The shell pressure side and the shell suction side converge in a trailing end region. A ceramic matrix composite (CMC) liner lines the monolithic ceramic shell. There is a flow discharge passage in the trailing edge region between the shell pressure side wall and the shell suction side wall. There are pedestals disposed in the flow discharge passage, and each pedestal is bonded to the shell pressure side wall and to the shell suction side wall.

In a further example of any of the foregoing embodiments, the pedestals are bonded to the CMC liner.

In a further example of any of the foregoing embodiments, the CMC liner includes a liner pressure side wall lining the shell pressure side wall and a liner suction side wall lining the shell suction side wall, the liner pressure side wall and the liner suction side wall meeting to form a liner tail that extends in the flow discharge passage.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
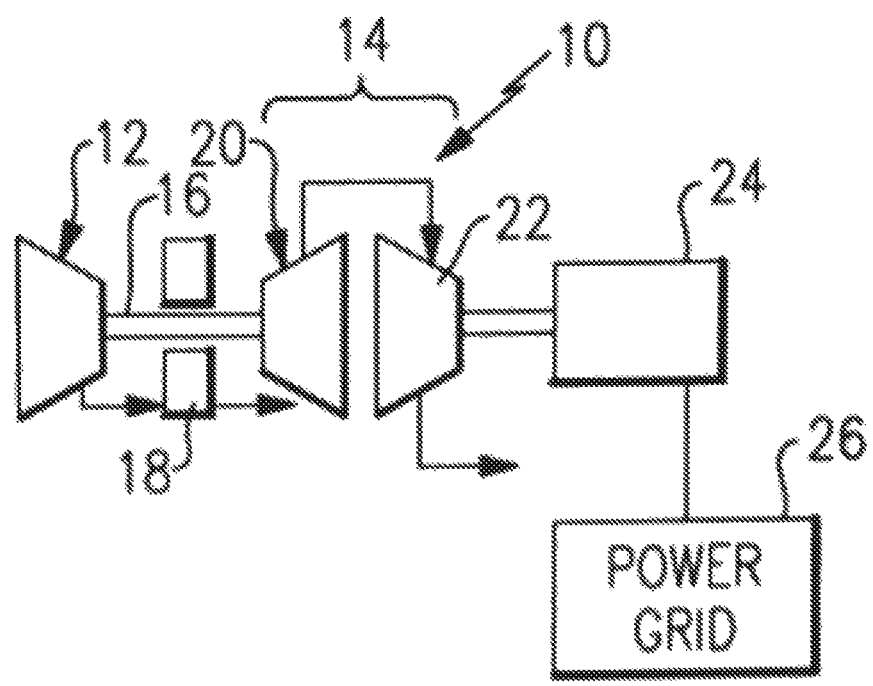
FIG. 1 illustrates an example gas turbine engine.

FIG. 1 schematically illustrates a gas turbine engine 10. The engine 10 includes a compressor section 12 and a turbine section 14 interconnected by a shaft 16. A combustor 18 is arranged between the compressor and turbine sections 12/14. The turbine section 14 includes first and second turbines 20/22, which correspond to high and low pressure turbines, respectively. A generator 24 is rotationally driven by a shaft coupled to the low pressure turbine 22, or power turbine. The generator 24 provides electricity to a power grid 26. It should be understood that the illustrated engine 10 is highly schematic, and may vary from the configuration illustrated. Moreover, the examples herein are not limited to industrial turbines and may be used in propulsion gas turbine engines.

Figure 2:
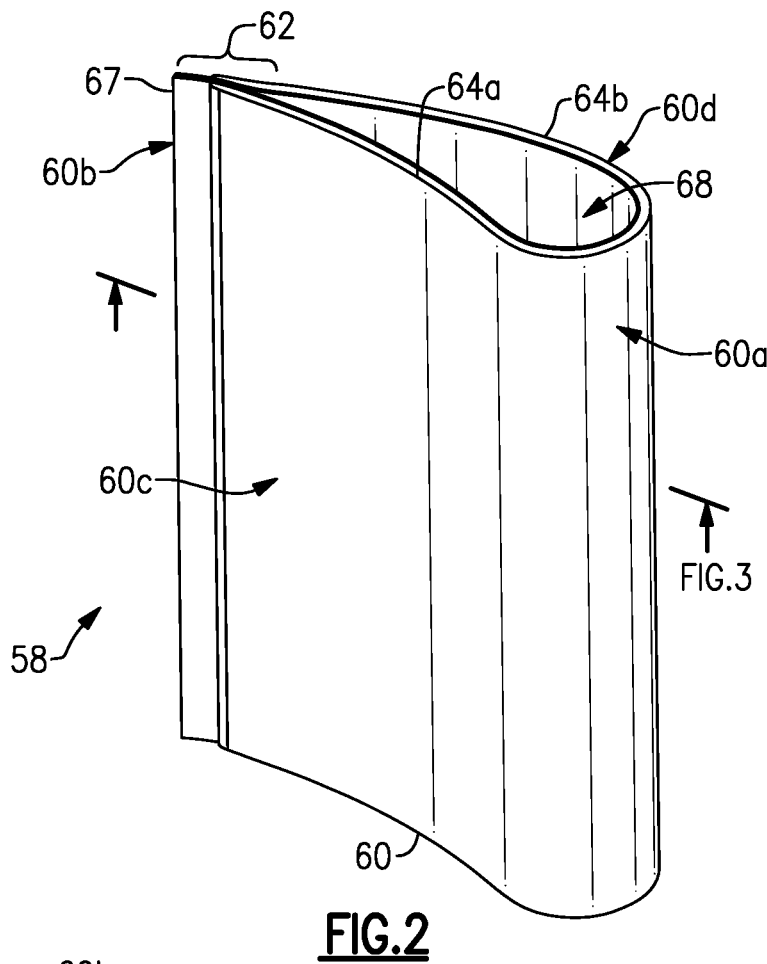
FIG. 2 illustrates a perspective view of an airfoil.
Figure 3:
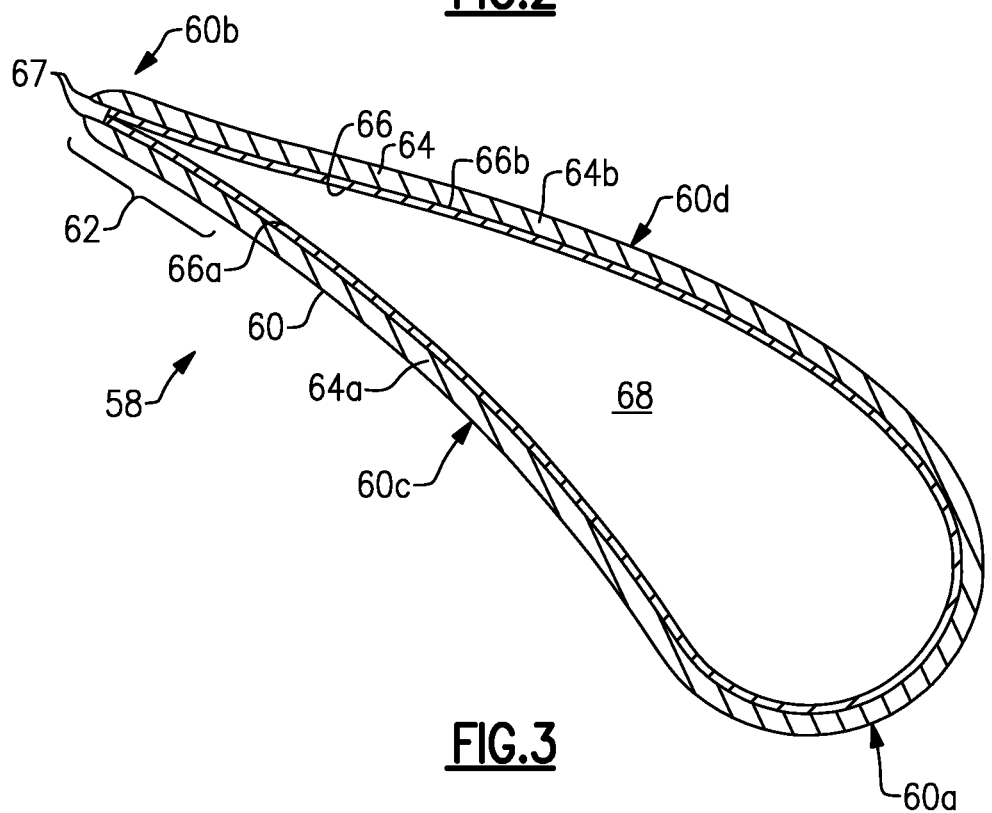
FIG. 3 illustrates a sectioned view of the airfoil.

FIG. 2 illustrates an isolated view of an airfoil 58 from the turbine section 14 of the engine 10, and FIG. 3 illustrates a sectioned view. In this example, only the airfoil section is shown, however, it is to be understood that the airfoil 58 may be a blade or a vane that includes platforms, a root, end caps, etc. that are known for blades or vanes. The airfoil 58 is generally comprised of an airfoil body 60 that defines a leading edge 60a, a trailing edge 60b, a first or pressure side 60c, and a second or suction side 60d. This disclosure will also refer to a trailing edge region 62, designated as 62. The region 62 includes the portion of the airfoil 58 from the aft-most or terminal edge of the airfoil 58 and the immediate vicinity extending forward from the terminal edge. The terminology "first" and "second" as used herein is to differentiate that there are two architecturally distinct components or features. It is to be further understood that the terms "first" and "second" are interchangeable in the embodiments herein in that a first component or feature could alternatively be termed as the second component or feature, and vice versa.

The airfoil body 60 generally includes a monolithic ceramic shell 64 (hereafter "shell 64") and a ceramic matrix composite liner 66 (hereafter "liner 66") that lines, and is bonded to, the interior surfaces of the shell 64. The shell 64 and liner 66 circumscribe a core passage 68. The example airfoil 58 is shown with a single core passage 68, however, it is to be understood that the airfoil 58 may alternatively have additional core passages with ribs or other structures that subdivide the core passage 68. The core passage 68 is connected to a cooling air source, such as bleed air from the compressor section 24, which provides relatively cool air into the core passage 68 for cooling the airfoil 58.

The shell 64 is comprised of first and second monolithic ceramic exterior walls 64a/64b. In the illustrated example, the wall 64a is a shell pressure side wall, and the wall 64b is a shell suction side wall. The walls 64a/64b generally converge toward each other in the trailing end region 62 and terminate at respective terminal edges 67. As shown in the illustrated example, the walls 64a/64b are part of a single, continuous wall piece. It is to be understood, however, that the walls 64a/64b may alternatively be provided as two pieces or even more than two pieces.

The liner 66 is comprised of first and second CMC liner walls 66a/66b. In the illustrated example, the wall 66a is a liner pressure side wall, and the wall 66b is a liner suction side wall. The wall 66a lines the wall 64a of the shell 64, and the wall 66b lines the wall 64b of the shell 66. As shown in the illustrated example, the walls 66a/66b are part of a single, continuous wall piece. It is to be understood, however, that the walls 66a/66b may alternatively be provided as two pieces or even more than two pieces.

The monolithic ceramic of the shell 64 layer may be, but is not limited to, silicon carbide (SiC), silicon nitride ($Si_3N_4$), alumina ($Al_2O_3$), silicon aluminum oxynitride (SiAlON), nitride bonded silicon carbide (NBSC), aluminum nitride (AlN), silicon oxynitride ($Si_2N_2O$), hafnia ($HfO_2$), zirconia ($ZrO_2$), or other oxides, carbides, or nitrides, and particulate composites thereof.

The ceramic matrix composite of the liner 66 includes bundles of fibers called tows in the form of yarns of unidirectional tape disposed in a ceramic matrix. The fibers within the CMC layers include fiber bundles woven into plies, like cloth, which are assembled into a fiber-reinforced preform which is later infiltrated with the ceramic matrix. Most typically, the fibers are ceramic fibers that are provided as a fiber network, such as woven plies, fibrous mats, and the like. The fibers may be, but are not limited to, non-oxide fibers such as SiC fibers or oxide fibers such as aluminosilicate fibers. The fibers may also be coated with boron nitride (BN) or other interface material to prevent bonding with the matrix.

The ceramic matrix of the liner 66 may be, but is not limited to, amorphous compounds of silicon, carbon, nitrogen, oxygen, boron, or other light elements. Example compounds include SiC, $Al_2O_3$, $Si_3N_4$, boron nitride (BN), SiAlON, AlN, magnesium aluminum silicate (MAS), lithium aluminum silicate, barium aluminum silicate (BAS), barium magnesium aluminum silicate (BMAS), and combinations thereof. Those skilled in the art will recognize that other matrices, including metalloids such as silicon or alloys thereof, could be employed.

The design of a trailing edge of an airfoil is preferably thin for enhanced aerodynamics. However, a thin trailing edge may have structural weakness and is difficult to cool, especially for a turbine airfoil exposed to high temperatures and heat fluxes. In this regard, the trailing edge region 62 of the airfoil 58 is configured to facilitate a thin, strong, cooled trailing edge structure. The following description demonstrates various non-limiting example configurations.

Figure 4A:
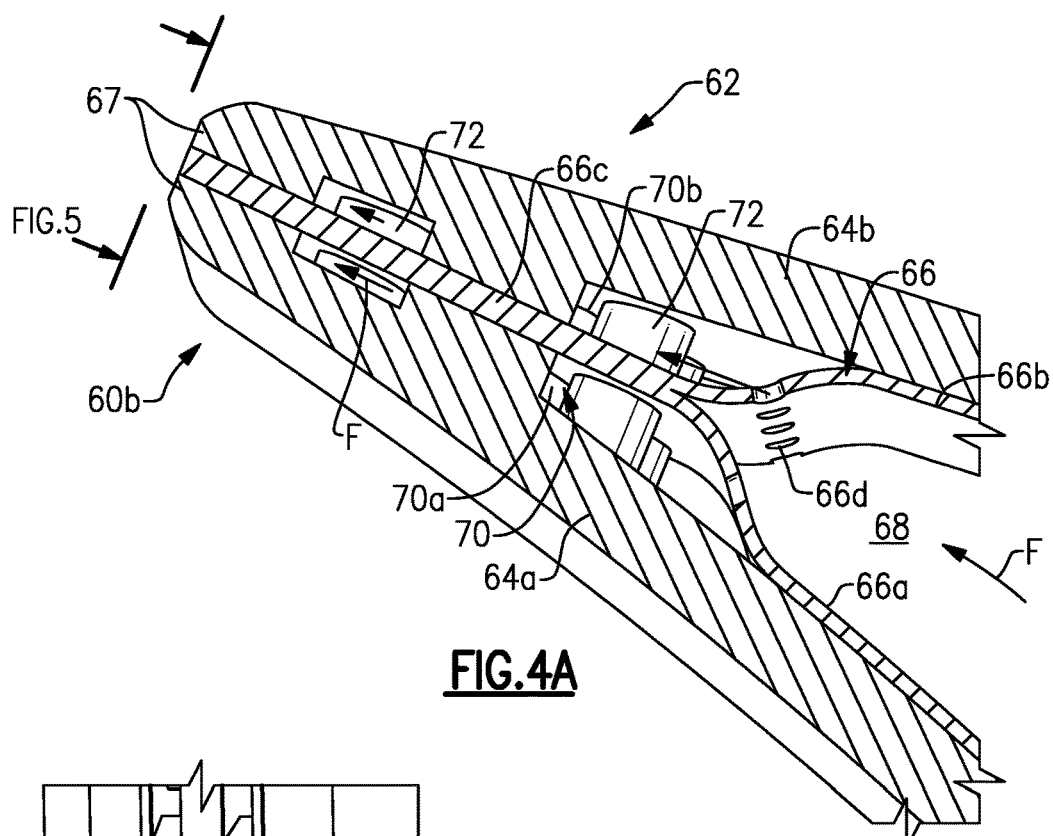
FIG. 4A illustrates a sectioned view of a trailing end region of the airfoil.
Figure 5:
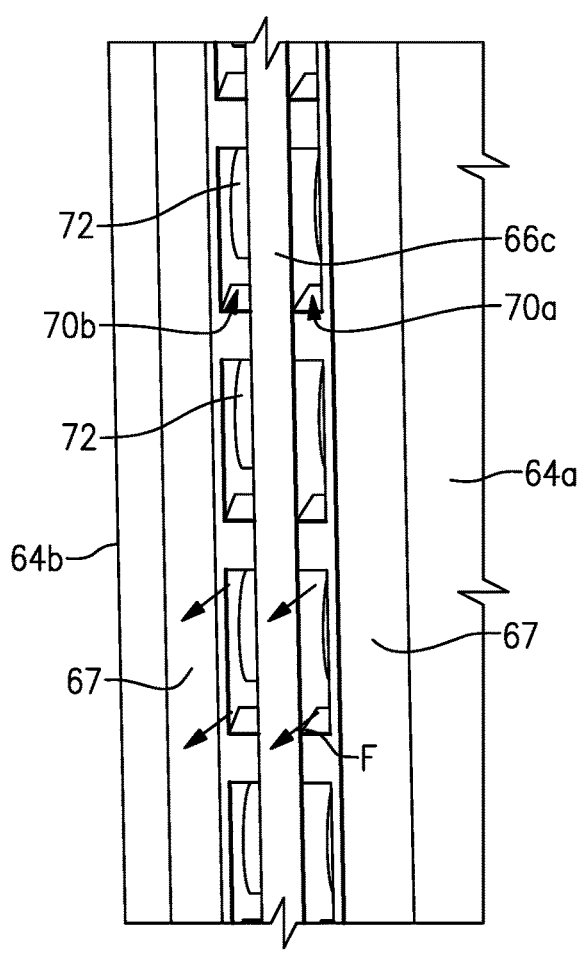
FIG. 5 illustrates a perspective view of the trailing end region of FIG. 4A.

FIG. 4A illustrates a sectioned view of the trailing edge region 62, and FIG. 5 illustrates a perspective view of the trailing end region of FIG. 4A. The airfoil 58 includes a cooling flow discharge passage 70 between the walls 64a/64b of the shell 66. For example, the passage 70 is the space or region bounded by the interior surfaces of the walls 64a/64b.

In this example, the walls 66a/66b of the liner 66 also converge in the trailing edge region 62 and may form a liner tail 66c. The CMC liner tail 66c is a radially elongated strip that generally projects in an axially aft direction and includes one or more layers of CMC plies. In this example, the liner tail 66c extends along the axial centerline of the flow discharge passage 70, dividing the flow discharge passage 70 into first and second sub-passages 70a/70b between, respectively, the liner tail 66c and the wall 64a and the liner tail 66c and the wall 64b of the shell 66. In another embodiment, the CMC liner tail may extend aft axially along the suction side monolithic ceramic shell, and is continuously bonded to it. In another embodiment, the CMC liner tail may also extend aft axially along the pressure side monolithic ceramic shell, and bonded to it. In another embodiment, the CMC liner tail does not extend all the way to the trailing edge of the airfoil, but instead, it can either stop at the cutback 74 or before the cutback 74. The purpose of the CMC liner here is to provide structural support, strength and bonding between the pressure and suction sides. It is to be understood that the CMC layers may include one or more distinct fiber layers, such as layers of cloth, within one portion of the liner layer depicted.

Figure 4B:
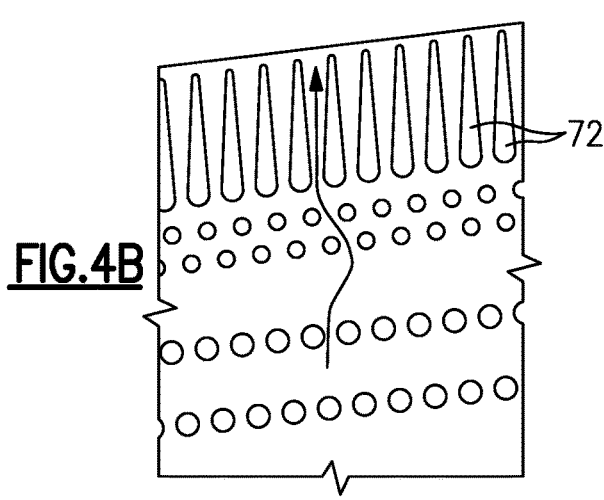
FIG. 4B illustrates an example of staggered teardrop-shaped pedestals of a trailing end region of the airfoil.
Figure 4C:
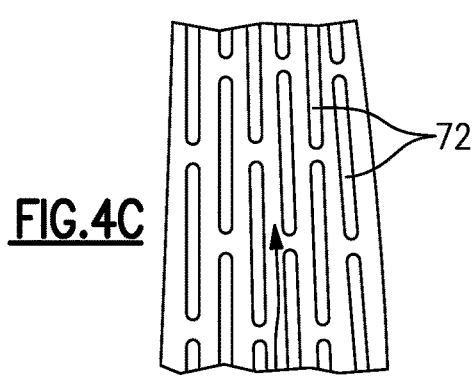
FIG. 4C illustrates an example of oblong pedestals of a trailing end region of the airfoil.

The airfoil 58 further includes an array of pedestals 72 located in the flow discharge passage 70 and allows for cooling air to flow from the aft-most core passage through the trailing edge and out the airfoil to the hot gas stream. The array may be a pattern arrangement of the pedestals 72, such as but not limited to, staggered rows of pedestals 72. The pedestals 72 provide structure support between the pressure and suction sides of the monolithic ceramic shell, i.e., between the walls 64a/64b of the shell 66. These pedestals 72 also serve as flow guides for the cooling air, as well as heat sinks that transport heat from the hot monolithic ceramic shell to the cooling fluid that passes through them from the aft-most core passage and out the trailing edge. Each pedestal 72 bridges the liner tail (if present) 66c and at least one of the walls 64a/64b of the shell 64. As examples, the pedestals 72 may be, but are not limited to, pins, columns, fins, or the like, or combinations of flow guides 72 with different geometries. The pedestals 72 may have circular, oblong, race-track, or other cross-sectional shapes. The pedestals 72 can be arranged into a two-dimensional array of in-line or staggered columns of various round shapes, or they can be arranged into staggered teardrop-shaped pedestals as shown in FIG. 4B or stacks of long oblong columns as shown in FIG. 4C. The pedestals 72 exist to provide an increase in the amount of hot ceramic surface area exposed to the cooling air. The number, spacing, locations and shapes of the pedestals 72 are designed to provide the necessary cooling enhancement and structural support. Their shapes may also be designed to guide the cooling air flow, to maximize heat transfer with minimal pressure loss, and to speed up the cooling air so that it mixes with the hot gas stream around the airfoil with minimal aerodynamic mixing losses.

The pedestals 72 are formed of a monolithic ceramic and are in contact with, and bonded to, the walls 64a/64b of the shell 64. For example, the monolithic ceramic of the pedestals 72 may be the same composition as the monolithic ceramic of the shell 64 to enhance bonding by minimizing thermal expansion mismatch between the two portions of the airfoil. In one example to demonstrate this aspect, the pedestals 72 and walls 64a/64b are all formed of monolithic silicon carbide (SiC). As will be appreciated, other monolithic ceramics as discussed above may be substituted for silicon carbide.

There are several non-limiting configurations of how the pedestals 72 bridge the liner tail 66c and walls 64a/64b of the shell 64. In one configuration, which may be referred to as an extend-through configuration, each pedestal 72 is continuous between the walls 64a/64b and extends through the liner tail 66c. For instance, the liner tail 66c has openings that correspond in cross-section to the shape of the pedestals 72. Each pedestal 72 extends through one of the liner openings, with the sides of the openings contacting the sides of the pedestals 72.

In another configuration, which may be referred to as a clamp-on configuration, there are pairs of opposed pedestals 72. One of the pair extends from the wall 64a and the other of the pair extends from the wall 64b opposite the first of the pair. The flow guides 72 of the pair are aligned and the liner tail 66c is clamped, or "sandwiched," there between, facially contacting each pedestal 72 of the pair. As will be appreciated, further examples may have a portion of the flow guides 72 in the clamp-on configuration and another portion of the pedestals 72 in the extend-through configuration. Whether the clamp-on configuration, the extend-through configuration, or a modification of these, for purposes of strength and thermal transfer, the flow guides 72 should be in bonded contact with the liner tail 66c.

During operation of the engine 10, cooling air, generally indicated by flow arrows (F), is provided into the core passage 68. The cooling air cools the airfoil body 60 and is then discharged from the airfoil 58 into the core gas path C though the flow discharge passage 70. In this example, since the walls 66a/66b of the liner 66 surround the core passage 68 and then meet to form the liner tail 66c, the cooling air must be able to flow through the liner 66 to reach the flow discharge passage 70. In this regard, the gaps between the pedestals and walls 66a/66b serve as metering orifices 66d proximate to the liner tail 66c. Metering orifices 66d in the wall 66a lead to the sub-passage 70a, while metering orifices 66d in the wall 66b lead to the sub-passage 70b. As will be appreciated, the orifices 66d may have a circular, oblong, or other shape.

The pedestals 72 in the flow discharge passage 70 facilitate the enhancement of cooling in the trailing end region 62. For example, the pedestals 72 act as thermal conducting elements to transfer heat from the walls 64a/64b of the shell 64 and the walls 66a/66b of the liner 66 and then dissipate that heat to the cooling air in the flow discharge passage 70. The pedestals 72 also increase surface area for heat transfer in the flow discharge passage 70 and serve as turbulators that mix the flow to enhance convective heat transfer.

The pedestals 72 also serve to mechanically strengthen the trailing edge region 62. For example, at least in the extend-through configuration, the pedestals 72 mechanically tie the walls 64a/64b of the shell 64 together. The mechanical tie facilitates holding the walls 64a/64b together against the internal pressure of the cooling air, aerodynamic and centrifugal loading, and thermal strains due to non-uniform thermal expansion. The mechanical strengthening may also facilitate a thin design of the trailing edge region 62, as thicker walls are not needed for strength.

Figure 4D:
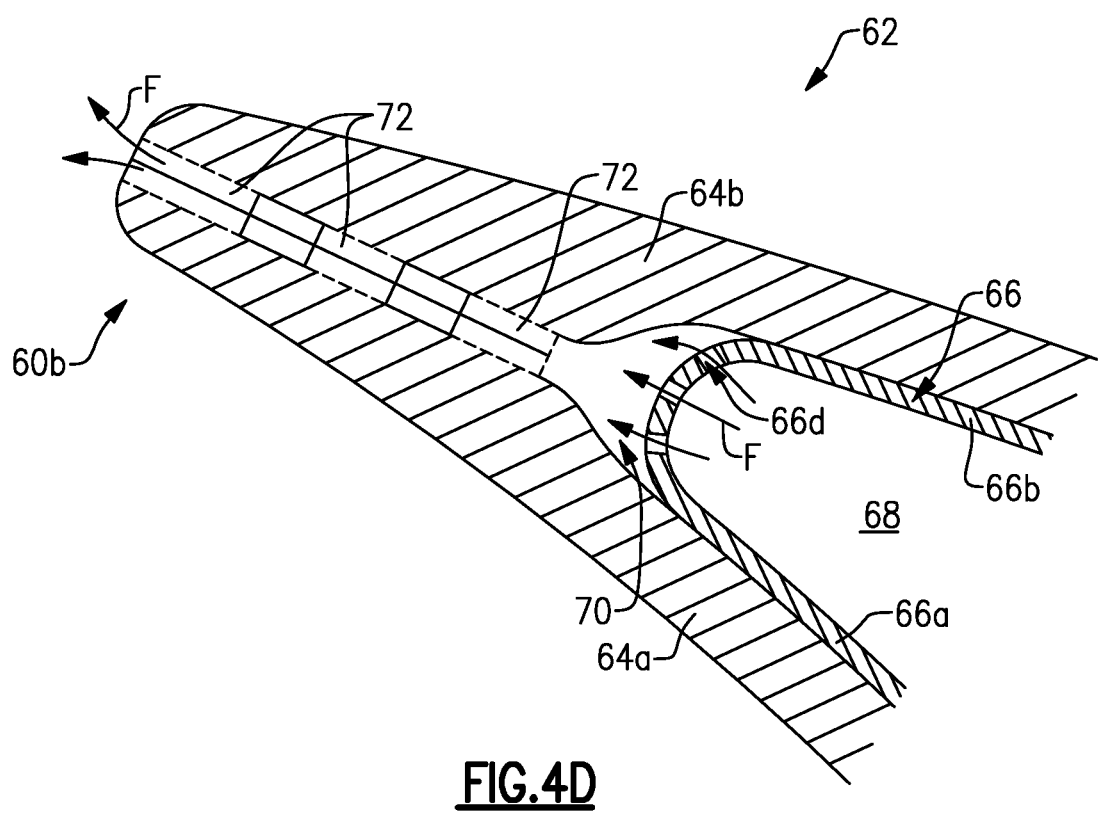
FIG. 4D illustrates a modified example of the trailing edge region.

FIG. 4D illustrates a modified example of the trailing edge region 62 shown in FIG. 4A except that in this example the liner 66 does not have the liner tail 66c. Rather, the liner 66 wraps around the core passage 68 and does not extend into the region of the pedestals 72. Thus, the region with the pedestals 72 is composed entirely of the shell 64 and pedestals 72. The walls 64a/64 be may be bonded directly to each other and/or bonded to each other through the pedestals 72.

Figure 6:
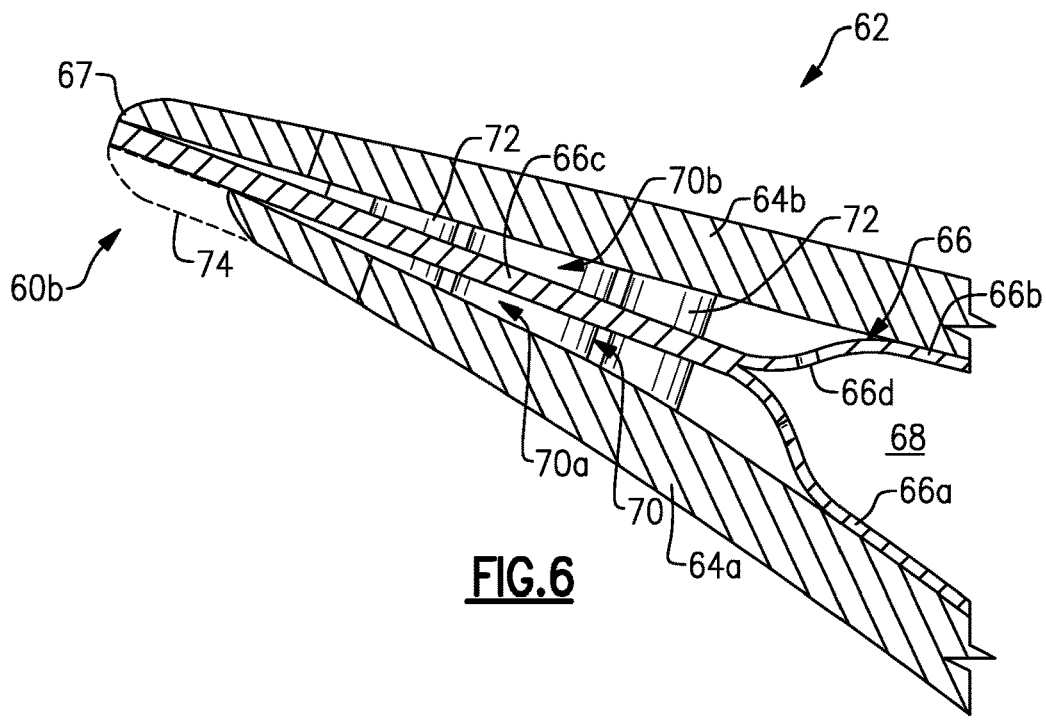
FIG. 6 illustrates a sectioned view of another example trailing end region of the airfoil.
Figure 7:
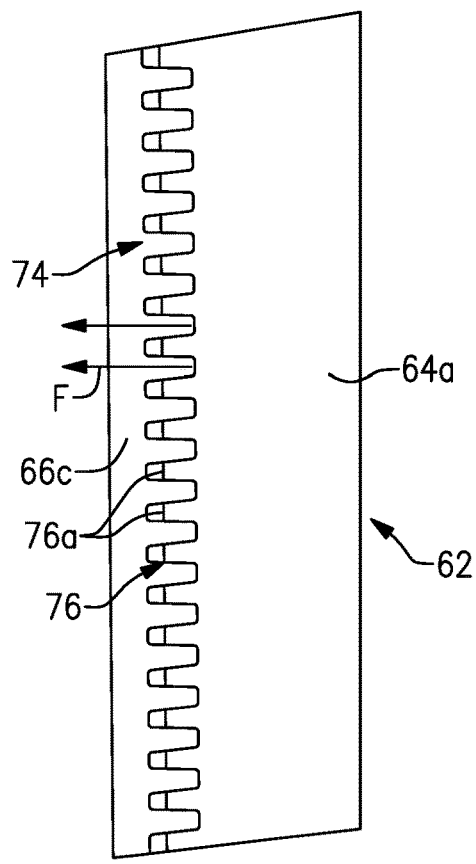
FIG. 7 illustrates a perspective view of the trailing end region of FIG. 6.

FIG. 6 illustrates a modified example of the trailing edge region 62, and FIG. 7 illustrates a perspective aft-looking-forward view of the trailing edge region 62. In the example of FIGS. 4 and 5, the walls 64a/64b of the shell 64 are substantially co-extensive with regard to the respective terminal edges 67. In the example shown in FIGS. 6 and 7, however, the wall 64a (shell pressure side wall) includes a cutback 74 such that the wall 64a is axially shorter than the wall 64b. A "cutback" as used herein refers either to a region that has been physically removed and/or a region that has been excluded or left open by design. That is, the "cutback" does not necessarily require or imply actual cutting.

The liner tail 66c extends axially beyond the cutback 74 such that the thickness of the trailing edge 60b is comprised only of the thickness of the wall 64b of the shell 64 and the thickness of the liner tail 66c. The cutback 74 thereby enables a thinner design in comparison to the example of FIGS. 4 and 5. Moreover, the cooling air that is discharged from the flow discharge passage 70 may serve to film cool the trailing edge 60b.

FIGS. 6 and 7 also demonstrate a scalloped wall. As shown, the wall 64a of the shell 64 is scalloped, as designated at 76. For instance, the scallop 76 includes spaced-apart projecting teeth 76a. The scallop 76 facilitates the ejection of the cooling fluid to the main hot gas stream around the airfoil by accelerating it up to the speed of the hot gas flow, and by diffusing the air so that it lays down a film of air parallel to the airfoil surface. The scallop also provides structural support and cooling surface area.

Figure 8:
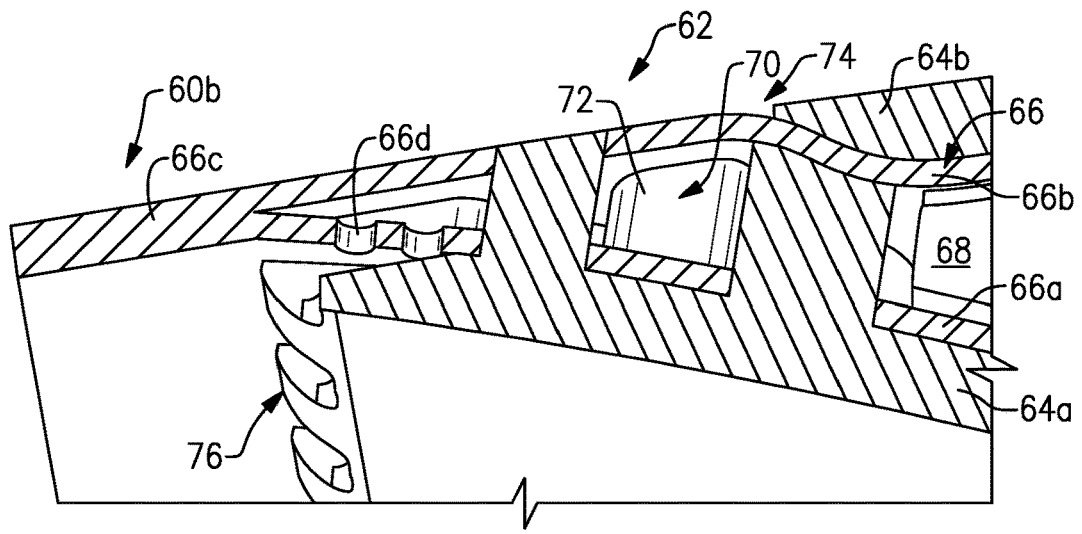
FIG. 8 illustrates a sectioned view of another example trailing end region of the airfoil.
Figure 9:
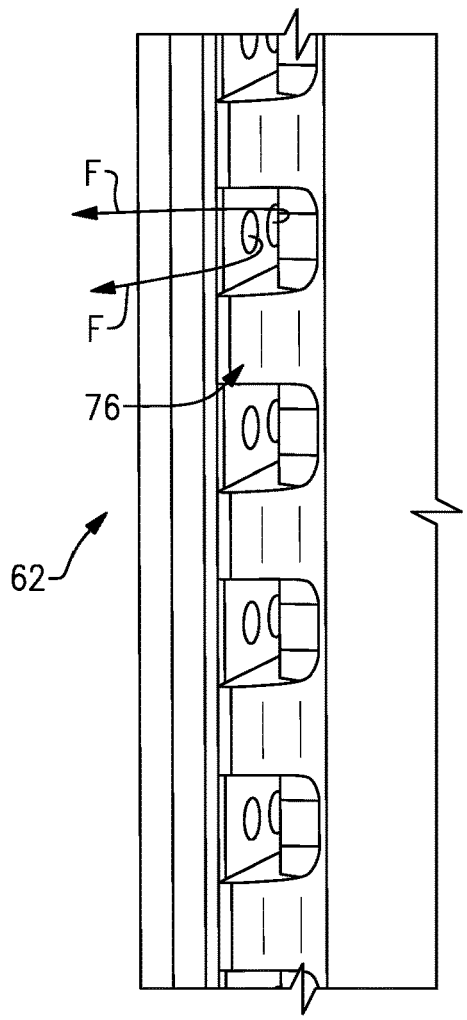
FIG. 9 illustrates a perspective view of the trailing end region of FIG. 8.

FIG. 8 illustrates another modified example of the trailing edge region 62, and FIG. 9 illustrates a perspective aft-looking-forward view of the trailing edge region 62. In this example, the location where the walls 66a/66b of the liner 66 meet to form the liner tail 66c is moved aft beyond the walls 64a/64b such that the liner tail 66c forms the trailing edge 60b. Additionally, the wall 64b of the shell 64 includes a cutback 74 and the wall 66b extends into the cutback 74. The flow discharge passage 70 thus extends between the walls 66a/66b of the liner 66. In place of being bonded to the wall 64b of the shell 64, the pedestals 72 are bonded to the wall 66b of the liner 66. The opposite ends of the pedestals 72 may clamp the wall 66a or extend through the wall 66a and bond to the wall 64a of the shell 64. The metering orifices 66d are also moved aft, into the flow discharge passage 70. The liner tail 66c extends axially beyond the walls 64a/64b of the shell 64 such that the thickness of the trailing edge 60b is comprised only of the thickness of the liner tail 66c.

Cooling air enters the flow discharge passage 70 from the core passage 68. If metering into the flow discharge passage 70 is desired, a metering structure may be provided. The cooling air flows through the flow discharge passage 70 and then through the orifices 66d to be discharged.

In the examples herein, the combination of the monolithic ceramic of the shell 64 and the ceramic matrix composite of the liner 66 may facilitate high temperature operability, good strength-to-weight ratio, toughness, durability, and cost efficiency. The shell 64 provides very high temperature resistance, impact resistance, strength against compression forces/stresses, and chemical stability against oxidation, corrosion, and erosion (recession). The shell 64 may also serve as a thick environmental protection layer for the liner 66. The shell 64 can also can be readily formed or machined to have smooth surfaces for aerodynamic performance in comparison to ceramic matrix composites. The liner 66 also facilitates high temperature resistance, although some ceramic matrix composites may be generally less temperature resistant than the monolithic ceramic. The liner 66 primarily serves to strengthen the airfoil 58 against tensile forces/stresses and creep.

The liner 66 may be fabricated using a fiber-reinforced preform and then infiltrating the preform with a ceramic matrix material or precursor to the ceramic matrix material. The infiltration may be conducted by any of a variety of methods, including but not limited to, chemical vapor infiltration (CVI), polymer infiltration and pyrolysis (PIP), transfer molding, and melt infiltration (MI). The shell 64 may be prefabricated using known ceramic processing techniques. The preform may be constructed in the desired geometry in the shell 64, in contact with the interior surfaces of the shell 64. For example, fiber plies are built-up to construct the walls of the liner 66. Upon densification of the ceramic matrix of the liner 66, due to the contact between the preform and the monolithic ceramic of the shell 66, the ceramic matrix material strongly bonds with the monolithic ceramic. Such bonding facilitates mechanical strength in the airfoil 58 as well as heat transfer through joined interfaces between the shell 64 and the liner 66.

Alternatively, the liner 66 may be prefabricated and densified prior to bonding with the shell 64 and then assembled into the shell 64. A brazing material, such as but not limited to elemental silicon, may be provided at the interfaces that are to be joined. Upon heating to an appropriate brazing temperature for the selected brazing material, the brazing material diffuses and bonds the shell 64 and liner 66 together.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising:
    a monolithic ceramic shell defining a leading end, a shell pressure side wall, and a shell suction side wall, the monolithic ceramic shell circumscribing a core passage;
    a ceramic matrix composite (CMC) liner defining a liner pressure side wall lining the shell pressure side wall and a liner suction side wall lining the shell suction side wall, the liner pressure side wall and the liner suction side wall converging and meeting to form a liner tail, the shell pressure side wall and the shell suction side wall converging around the liner tail in a trailing edge region, and the CMC liner being in continuous contact with the monolithic ceramic shell across the shell pressure side wall from the trailing edge region, across the leading end, and across the shell suction side wall to the trailing end region;
    a flow discharge passage in the trailing edge region between the shell pressure side wall and the shell suction side wall, the flow discharge passage being connected with the core passage; and
    pedestals disposed in the flow discharge passage.

2. The airfoil as recited in claim 1, wherein the pedestals are bonded to at least one of the shell pressure side wall or the shell suction side wall.

3. The airfoil as recited in claim 2, wherein the pedestals are monolithic ceramic.

4. The airfoil as recited in claim 1, wherein the liner pressure side wall and the liner suction side wall include metering orifices therein or between the pedestals connecting the core passage and the flow discharge passage.

5. The airfoil as recited in claim 1, wherein the shell pressure side wall includes a cutback.

6. An airfoil comprising:
a monolithic ceramic shell defining a leading end, a shell pressure side wall, and a shell suction side wall, the monolithic ceramic shell circumscribing a core passage;
a ceramic matrix composite (CMC) liner defining a liner pressure side wall lining the shell pressure side wall and a liner suction side wall lining the shell suction side wall, the liner pressure side wall and the liner suction side wall converging and meeting to form a liner tail, the shell pressure side wall and the shell suction side wall converging around the liner tail in a trailing edge region, and the CMC liner being in continuous contact with the monolithic ceramic shell across the shell pressure side wall from the trailing edge region, across the leading end, and across the shell suction side wall to the trailing end region;
a flow discharge passage in the trailing edge region between the shell pressure side wall and the shell suction side wall, the flow discharge passage being connected with the core passage; and
pedestals disposed in the flow discharge passage, wherein the pedestals are monolithic ceramic, are bonded to at least one of the shell pressure side wall or the shell suction side wall, and are bonded to the CMC liner.

7. An airfoil comprising:
a monolithic ceramic shell defining a leading end, a shell pressure side wall, and a shell suction side wall, the monolithic ceramic shell circumscribing a core passage;
a ceramic matrix composite (CMC) liner defining a liner pressure side wall lining the shell pressure side wall and a liner suction side wall lining the shell suction side wall, the liner pressure side wall and the liner suction side wall converging and meeting to form a liner tail, the shell pressure side wall and the shell suction side wall converging around the liner tail in a trailing edge region, and the CMC liner being in continuous contact with the monolithic ceramic shell across the shell pressure side wall from the trailing edge region, across the leading end, and across the shell suction side wall to the trailing end region;
a flow discharge passage in the trailing edge region between the shell pressure side wall and the shell suction side wall, the flow discharge passage being connected with the core passage; and
pedestals disposed in the flow discharge passage, wherein the liner tail divides the flow discharge passage into sub-passages.

8. An airfoil comprising:
a monolithic ceramic shell defining a leading end, a shell pressure side wall, and a shell suction side wall, the shell pressure side wall and the shell suction side wall converging in a trailing edge region;
a ceramic matrix composite (CMC) liner lining the monolithic ceramic shell, and the CMC liner being in continuous contact with the monolithic ceramic shell across the shell pressure side wall from the trailing edge region, across the leading end, and across the shell suction side wall to the trailing end region;
a flow discharge passage in the trailing edge region between the shell pressure side wall and the shell suction side wall; and
pedestals disposed in the flow discharge passage, each said pedestal being bonded to the shell pressure side wall bonded to the shell suction side wall, and bonded to the CMC liner.

9. The airfoil as recited in claim 8, wherein the CMC liner includes a liner pressure side wall lining the shell pressure side wall and a liner suction side wall lining the shell suction side wall, the liner pressure side wall and the liner suction side wall meeting to form a liner tail that extends in the flow discharge passage.

10. An airfoil comprising:
a monolithic ceramic shell defining a leading end, a shell pressure side wall, and a shell suction side wall, the monolithic ceramic shell circumscribing a core passage;
a ceramic matrix composite (CMC) liner defining a liner pressure side wall lining the shell pressure side wall and a liner suction side wall lining the shell suction side wall, the liner pressure side wall and the liner suction side wall converging to form a liner tail, the shell pressure side wall and the shell suction side wall converging around the liner tail in a trailing edge region, and the CMC liner being in continuous contact with the monolithic ceramic shell across the shell pressure side wall from the trailing edge region, across the leading end, and across the shell suction side wall to the trailing end region, wherein in the trailing edge region the CMC liner departs from the continuous contact with the monolithic ceramic shell such that the liner pressure side wall and the liner suction side wall converge to form the liner tail;
a flow discharge passage in the trailing edge region between the shell pressure side wall and the shell suction side wall, the flow discharge passage being connected with the core passage, and the liner tail extending in the flow discharge passage; and
pedestals disposed in the flow discharge passage.

11. The airfoil as recited in claim 10, wherein the liner tail divides the flow discharge passage into first and second sub-passages between, respectively, the liner tail and the shell pressure side wall and the liner tail and the shell suction side wall.

12. The airfoil as recited in claim 11, wherein the liner suction side wall includes a wall region between a location where the liner suction side wall departs from the continuous interfacial contact with the monolithic ceramic shell and a location at which the liner suction side wall and the liner pressure side wall converge to form the liner tail, and the wall region includes orifices that connect the core passage and the first sub-passage.

13. The airfoil as recited in claim 11, wherein the liner pressure side wall includes a wall region between a location where the liner pressure side wall departs from the continuous interfacial contact with the monolithic ceramic shell and a location at which the liner pressure side wall and the liner suction side wall converge to form the liner tail, and the wall region includes orifices that connect the core passage and the second sub-passage.

14. The airfoil as recited in claim 11, wherein the liner tail is spaced apart from each of the shell pressure side wall and the shell suction side wall.

15. The airfoil as recited in claim 11, wherein each of the pedestals extends through the liner tail from the shell pressure side wall to the shell suction side wall.

* * * * *